(12) United States Patent
Paisley et al.

(10) Patent No.: US 10,597,145 B2
(45) Date of Patent: Mar. 24, 2020

(54) WINGLET

(71) Applicant: Airbus Operations Limited, Bristol (GB)

(72) Inventors: Jon Paisley, Bristol (GB); Trudie Savage, Bristol (GB); Samuel Moore, Bristol (GB); Anthony Meisner, Bristol (GB)

(73) Assignee: Airbus Operations Limited, Bristol (GB)

( * ) Notice: Subject to any disclaimer, the term of this patent is extended or adjusted under 35 U.S.C. 154(b) by 261 days.

(21) Appl. No.: 15/597,948

(22) Filed: May 17, 2017

(65) Prior Publication Data

US 2017/0341737 A1 Nov. 30, 2017

(30) Foreign Application Priority Data

May 24, 2016 (GB) .................................. 1609143.1

(51) Int. Cl.
| | | |
|---|---|---|
| *B64C 1/26* | (2006.01) | |
| *B64C 23/06* | (2006.01) | |
| *B64C 3/26* | (2006.01) | |
| *B64C 5/08* | (2006.01) | |
| *B64C 3/10* | (2006.01) | |
| *B64C 3/58* | (2006.01) | |

(52) U.S. Cl.
CPC .............. *B64C 23/069* (2017.05); *B64C 1/26* (2013.01); *B64C 3/10* (2013.01); *B64C 3/26* (2013.01); *B64C 3/58* (2013.01); *B64C 5/08* (2013.01); *B64C 23/06* (2013.01); *Y02T 50/162* (2013.01)

(58) Field of Classification Search
CPC ....... B64C 1/26; B64C 23/065; B64C 23/069; B64C 23/06; B64C 3/00; B64C 3/10; B64C 3/26; B64C 3/58; B64C 5/08; Y02T 50/162; Y02T 50/164
USPC ....................................................... 244/199.4
See application file for complete search history.

(56) References Cited

U.S. PATENT DOCUMENTS

| 2,539,357 A | 1/1951 | Wald |
| 5,738,331 A | 4/1998 | Woolley |
| 6,224,451 B1 | 5/2001 | Lai |

(Continued)

FOREIGN PATENT DOCUMENTS

| CN | 101214853 | 7/2008 |
| EP | 1 584 817 | 10/2005 |

(Continued)

OTHER PUBLICATIONS

Combined Search Report cited in GB 1609143.1, dated Dec. 1, 2016, 6 pages.

(Continued)

*Primary Examiner* — Claude J Brown
(74) *Attorney, Agent, or Firm* — Nixon & Vandherhye P.C.

(57) ABSTRACT

A winglet for attachment to a wing portion of an aircraft including a winglet root. The winglet root defines a recess for receiving a connector of the wing portion in use and includes at least one protrusion for receipt into at least one corresponding hole of the wing portion in use. A portion of the winglet root that at least partially defines an upper or a lower side of the recess has at least one hole extending therethrough for receiving a fastener for fastening the winglet to the connector when the connector is located in the recess.

19 Claims, 6 Drawing Sheets

(56) References Cited

U.S. PATENT DOCUMENTS

| | | | |
|---|---|---|---|
| 7,503,527 B1* | 3/2009 | Fairchild | B64C 3/54 |
| | | | 244/218 |
| 7,975,965 B2* | 7/2011 | Ackermann | B64C 3/18 |
| | | | 244/124 |
| 9,371,817 B2* | 6/2016 | Olthoff | F03D 1/065 |
| 9,499,255 B2* | 11/2016 | Chaussee | B64C 23/072 |
| 9,896,186 B2* | 2/2018 | Fong | B29C 70/222 |
| 2007/0018049 A1* | 1/2007 | Stuhr | B64C 23/069 |
| | | | 244/124 |
| 2009/0302159 A1 | 12/2009 | Pajard | |
| 2014/0346281 A1 | 11/2014 | Gratzer | |
| 2015/0132137 A1 | 5/2015 | Humblot et al. | |
| 2015/0203190 A1 | 7/2015 | Witte et al. | |
| 2015/0203200 A1 | 7/2015 | Bye et al. | |

FOREIGN PATENT DOCUMENTS

| | | | |
|---|---|---|---|
| EP | 2 792 595 | 10/2014 | |
| EP | 3 000 723 | 3/2016 | |
| GB | 2468978 | 9/2010 | |
| WO | WO-2014065718 A1 * | 5/2014 | B29C 70/14 |

OTHER PUBLICATIONS

Pipistrel, "Supplement for Removable Wingtips Option", predates May 2016, 5 pages.
Darling Downs Soaring Club. Inc., "Rigging and De-Rigging Instructions LS7—XOW", LS7 Rigging Instructions, predates May 2016, 27 pages.
European Search Report cited in EP 17 17 2495, dated Oct. 5, 2017, thirteen pages.

* cited by examiner

WINGLET

RELATED APPLICATION

This application claims priority to United Kingdom Application GB1609143.1 filed May 24, 2016 filed, the entirety is incorporated by reference.

TECHNICAL FIELD

The present invention relates to aircraft wings, and in particular to winglets for attachment to wing portions of aircraft.

BACKGROUND

Aircraft wings may comprise devices at their wingtips to change aerodynamic properties of the wings. For example, wing tip fences can act to control vortices at wingtips. Another example is winglets, which typically take the form of small wing-like structures at the end of aircraft wings, and which are angled with respect to the rest of the wing. A winglet may be an upper portion of a wingtip device that is typically angled toward the upper (i.e. suction) surface of the wing, or a lower portion of a wingtip device that is typically angled toward the lower (pressure) surface of the wing. A winglet, for example an upper portion of a wingtip device, can improve the efficiency of an aircraft by improving the lift to drag ratio of a wing. Winglets can also increase effective wingspan without substantially increasing the width of an aircraft. For example, when a wing bends during flight, a lower portion of a wingtip device at the end of the wing can become level so as to provide effective lift, and hence act as a quasi-span extension device. Since the width of an aircraft is often restricted, for example for compatibility with airports, winglets that extend the effective wingspan without extending the width of the plane can be of great utility.

A drawback of some known fittings of winglets to wing portions, such as butt strap fittings, is that interchange of parts so connected can take considerable time and effort, for example, due to the considerable number of components that need to be removed and refitted. Interchange can be particularly burdensome when complex wing geometries are involved, because such geometries can make achieving the required tolerances more difficult.

It would be advantageous for winglets to be easily and quickly attached to, and detached from, wing portions. This would, for example, assist rapid exchange of a winglet for another winglet in the case of damage being sustained by the winglet in use. It would also be advantageous if winglets met interchangeability requirements, i.e. to be able to be taken "off the shelf" and be quickly and easily installed onto and/or removed from a wing portion with minimum reworking of the winglet and/or wing portion.

SUMMARY

A first aspect of the present invention provides a winglet for attachment to a wing portion of an aircraft, the winglet comprising a winglet root, wherein the winglet root defines a recess for receiving a connector of the wing portion in use and comprises at least one protrusion for receipt into at least one corresponding hole of the wing portion in use, and wherein a portion of the winglet root that at least partially defines an upper or a lower side of the recess has at least one hole extending therethrough for receiving a fastener for fastening the winglet to the connector when the connector is located in the recess.

Optionally, the, or each, protrusion is a cylindrical protrusion.

Optionally, the, or each, protrusion has a root located in the recess.

Optionally, the, or each, protrusion has a tip located in the recess.

Optionally, a tip of the, or each, protrusion is chamfered.

Optionally, the, or each, protrusion is tapered from a root of the protrusion.

Optionally, the, or each, protrusion comprises a fusible portion.

Optionally, the at least one protrusion comprises a plurality of protrusions that extend along parallel respective axes.

Optionally, the winglet has a forward portion and an aft portion, wherein the at least one protrusion comprises a first protrusion and a second protrusion, and wherein the first protrusion is closer to the forward portion than to the aft portion and the second protrusion is closer to the aft portion than to the forward portion.

A second aspect of the present invention provides a winglet for attachment to a wing portion of an aircraft that has a convex aerodynamic surface portion, the winglet comprising a winglet root, a forward portion and an aft portion, wherein the winglet root defines a recess for receiving a connector of the wing portion in use, and wherein, when viewed in a direction parallel to a straight line extending from the forward portion to the aft portion, at least a portion of a mouth of the recess has a concave profile for mating with the convex aerodynamic surface portion of the wing portion.

Optionally, the winglet comprises one or more fairings, wherein the one or more fairings define a portion of the mouth. Optionally, the one or more fairings define the mouth.

Optionally, when viewed in the direction parallel to the straight line extending from the forward portion to the aft portion, all of the mouth of the recess has a concave profile for mating with the convex aerodynamic surface portion of the wing portion.

Optionally, a portion of the winglet root that at least partially defines an upper or a lower side of the recess has at least one hole extending therethrough for receiving a fastener for fastening the winglet to the connector when the connector is located in the recess.

Optionally, the winglet has a forward portion and an aft portion, and wherein the at least one hole through the portion of the winglet comprises a plurality of holes that are spaced apart along a substantially straight path that extends from the forward portion to the aft portion.

Optionally, the portion of the winglet is a skin of the winglet.

Optionally, the winglet is a lower portion of a wingtip device.

A third aspect of the present invention provides a wing portion for an aircraft, the wing portion having an aerodynamic surface portion and a connector protruding from the aerodynamic surface portion for locating in a recess of a winglet root of a winglet in use, wherein the wing portion comprises at least one hole for receiving at least one corresponding protrusion of the winglet in use.

Optionally, the connector comprises the, or each, hole.

Optionally, a mouth of the, or each, hole is chamfered.

Optionally, the, or each, hole is tapered from a mouth of the hole.

Optionally, the at least one hole comprises a plurality of holes that extend along parallel respective axes.

Optionally, the at least one hole comprises a plurality of holes that are spaced apart along a path that extends from a forward portion of the wing portion to an aft portion of the wing portion.

A fourth aspect of the present invention provides a wing portion for an aircraft, the wing portion having a convex aerodynamic surface portion and a connector protruding from the convex aerodynamic surface portion for locating in a recess of a winglet root of a winglet in use.

Optionally, the connector is affixed to the aerodynamic surface portion.

Optionally, the connector comprises at least one threaded surface for mating with a fastener for fastening the winglet to the connector when the connector is located in the recess.

Optionally, the threaded surface is a female screw thread.

Optionally, the connector comprises at least one barrel nut or anchor nut, and wherein the nut comprises the threaded surface.

A fifth aspect of the present invention provides a system, comprising:

a wing portion for an aircraft, the wing portion being according to the third or fourth aspect of the present invention; and a winglet for attachment to the wing portion, the winglet being according to the first or second aspect of the present invention.

A sixth aspect of the present invention provides an aircraft comprising a winglet according to the first or second aspect of the present invention, or comprising a wing portion according to the third or fourth aspect of the present invention, or comprising a system according to the fifth aspect of the present invention.

BRIEF DESCRIPTION OF THE DRAWINGS

Embodiments of the invention will now be described, by way of example only, with reference to the accompanying drawings, in which.

DETAILED DESCRIPTION

As used herein, the term "upper" is to be interpreted as meaning upper during normal use of the associated component on an aircraft. In some embodiments, an upper side or upper skin may be a suction surface. As used herein, the term "lower" is to be interpreted as meaning lower during normal use of the associated component on an aircraft. In some embodiments, a lower side or a lower skin may be a pressure surface.

Figure 1:
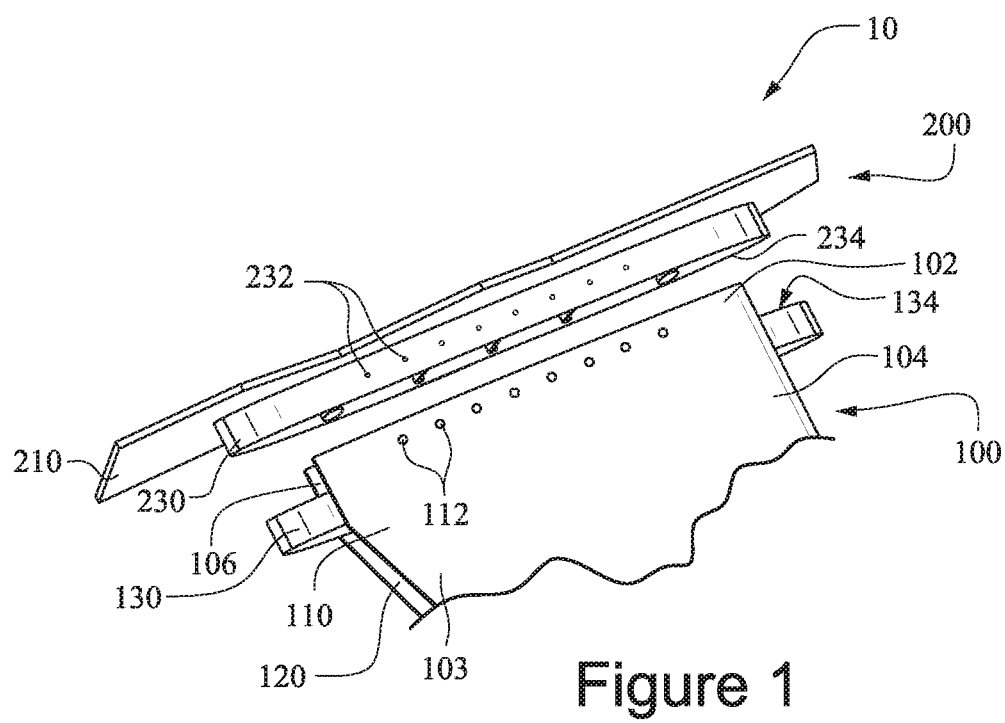
FIG. 1 shows a schematic view of a portion of a winglet and a wing portion according to an embodiment of the invention.

Referring to FIG. 1, there is shown a schematic view of a portion of a winglet 100 according to an embodiment of the invention and a wing portion 200 according to an embodiment of the invention. The winglet 100 is for attachment to the wing portion 200. The wing portion 200 is a wing portion for an aircraft, although the aircraft is not itself shown in full. In this embodiment, the wing portion 200 is an upper portion of a wingtip device at an end of a wing distal to the fuselage of the aircraft, and the winglet 100 is a lower portion of the wingtip device. Together the upper portion 200 and the lower portion 100 may form the wingtip device. It will be appreciated that although an upper portion 200 with an attachable lower portion 100 is illustrated, this need not necessarily be the case in other embodiments. For example, in some embodiments the wing portion 200 may instead be or comprise a lower portion of a wingtip device and the winglet 100 may be an upper portion of the wingtip device for attachment to the wing portion 200. The winglet 100 and the wing portion 200 are comprised in a system 10 according to an embodiment of the invention.

Figure 2:
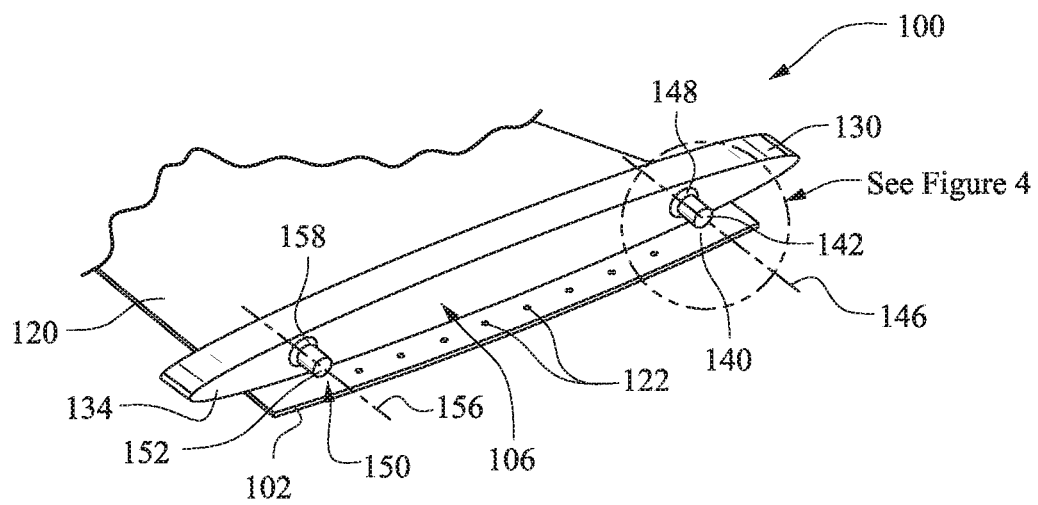
FIG. 2 shows a schematic view of the portion of the winglet of FIG. 1 with an upper surface of the winglet removed for clarity.
Figure 4:
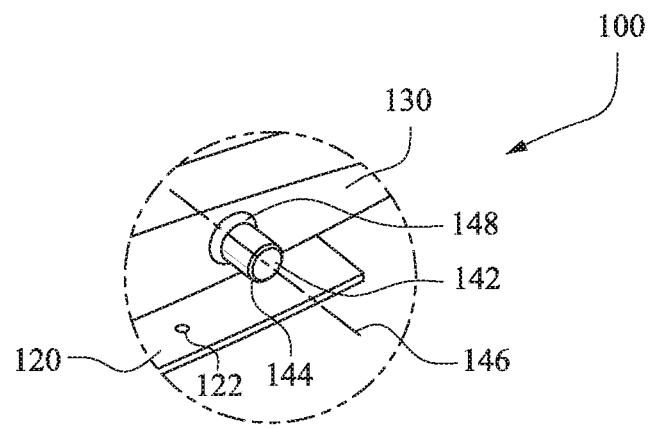
FIG. 4 shows a schematic close-up view of a protrusion of the winglet of FIG. 1.

With reference to FIGS. 1, 2 and 4, broadly speaking the winglet 100 of this embodiment comprises a winglet root 102, and the winglet root 102 defines a recess 106 for receiving a connector 230 of the wing portion 200 in use. The winglet root 102 further comprises first and second protrusions 140, 150 for receipt into first and second corresponding holes 240, 250 of the wing portion 200 in use. The first and second protrusions 140, 150 react against the first and second corresponding holes 240, 250 in use, thereby helping to counter torque loads of the winglet 100 about the connector 230.

More specifically, the winglet 100 of this embodiment comprises a winglet tip (not shown), the winglet root 102 opposite from the winglet tip, a forward portion 103 and an aft portion 104. The winglet root 102 is the portion of the winglet 100 that is closest to the wing portion 200 when the winglet 100 is attached to the wing portion 200 in use. Moreover, when the winglet 100 is attached to the wing portion 200, the forward portion 103 of the winglet 100 is closer to the front of the wing portion 200 than is the aft portion 104.

In this embodiment, the winglet 100 comprises an upper first skin 110, a lower second skin 120, and at least one bracket 130 affixed to, and located between, the first and second skins 110, 120. In this embodiment, the bracket may act as a rib to help retain the first and second skins 110, 120 relative to each other and to help add rigidity to the winglet 100. In some embodiments, the winglet 100 may have more than one bracket 130 affixed to, and located between, the first and second skins 110, 120. In this embodiment, the bracket 130 has a substantially elliptical cross sectional shape in a plane perpendicular to the first and second skins 110, 120. Although not shown in the drawings, the winglet 100 may also have one or more internal spars to help retain the first and second skins 110, 120 relative to each other and to help add rigidity to the winglet 100. The first and second skins 110, 120 may be attached to the bracket(s) 130 and/or spar(s) by permanent or semipermanent fastener(s), and should not need disassembly in service.

At the winglet root 102, the first and second skins 110, 120 extend beyond the bracket 130 so as to respectively define upper and lower sides of the recess 106 between the first and second skins 110, 120. That is, the recess 106 is defined by the combination of the first and second skins 110, 120 and the bracket 130. In this embodiments, each of the first and second skins 110, 120 has a plurality of holes 112, 122 extending therethrough. The holes 112, 122 are for receiving respective fasteners 300 for fastening the winglet 100 to the connector 230 when the connector 230 is located in the recess 106, as will be described in more detail below.

In this embodiment, the holes 112 through the first skin 110 are spaced apart along a substantially straight path that extends from the forward portion 103 to the aft portion 104. Similarly, in this embodiment, the holes 122 through the second skin 120 are spaced apart along a substantially straight path that extends from the forward portion 103 to the aft portion 104. However, in other embodiments, the holes 112 through the first skin 110 and/or the holes 122 through the second skin 120 may be spaced apart along a non-linear path that extends from the forward portion 103 to the aft portion 104. In some embodiments, there may be only a single such hole 112, 122 through the first skin 110 and/or through the second skin 120. In some embodiments, there may be no such holes 112, 122 through the first skin 110 and/or through the second skin 120.

In this embodiment, each of the protrusions 140, 150 extends from a surface 134 of the bracket 130 that faces, or partially defines, the recess 106. More specifically, the surface 134 of the bracket 130 is on an opposite side of the bracket 130 to the winglet tip (not shown). Accordingly, in use, each of the protrusions 140, 150 extends into the recess 106. However, in other embodiments one, or the, or each, of the protrusion(s) 140, 150 may extend from a portion of the winglet 100 other than such a surface 134 of the bracket 130, such as from a part of the winglet other than the bracket 130. The protrusions 140, 150 may be affixed to the bracket 130 by any suitable mechanism, or may be formed integrally with the bracket 130.

Each of the protrusions 140, 150 of the winglet 100 of this embodiment is a cylindrical protrusion 140, 150. Each of the protrusions 140, 150 may be considered a spigot. In other embodiments, the, or each, of the protrusions 140, 150 may have a different shape. For example, the protrusions 140, 150 may have a polygonal or elliptical cross sectional shape. The protrusions 140, 150 of this embodiment are relatively aligned so as to extend along parallel respective axes 146, 156. These axes 146, 156 are in turn aligned with the direction in which the connector 230 is to be inserted into the recess 106.

In this embodiment, each of the protrusions 140, 150 has a root 148, 158 located in the recess 106. Moreover, in this embodiment, each of the protrusions 140, 150 is dimensioned relative to the first and second skins 110, 120 so as to have a tip 142, 152 (i.e. an end distal from the root 148, 158) that is located in the recess 106. However, in other embodiments, the protrusions 140, 150 may project from the recess 106 so that the tip(s) 142, 152 are outside of the recess 106.

In this embodiment, the edge 144 of the tip 142, 152 of each protrusion 140, 150 is chamfered to aid insertion of the protrusions 140, 150 into the first and second corresponding holes 240, 250 of the wing portion 200 in use. However, in other embodiments, the tips 142, 152 may have a different shape, such as rounded-edged, domed or square-edged. Moreover, in this embodiment, each protrusion 140, 150 is tapered from its root 148, 158 towards its tip 142, 152. That is, a cross-sectional area of the protrusion 140, 150 perpendicular to the axis 146, 156 of the protrusion 140, 150 reduces with distance from the root 148, 158. This tapering may aid insertion of the protrusions 140, 150 into the first and second corresponding holes 240, 250 of the wing portion 200 in use, and/or may help in the transfer of shear loads between the protrusions 140, 150 and the connector 230 in use.

It will be evident from FIG. 2 that in this embodiment the first protrusion 140 and the second protrusion 150 are arranged relative to the forward and aft portions 103, 104 so that the first protrusion 140 is closer to the forward portion 103 than to the aft portion 104, and so that the second protrusion 150 is closer to the aft portion 104 than to the forward portion 103. This arrangement takes advantage of the length of the winglet root 102 between the forward and aft portions 103, 104, which enables the protrusions 140, 150 to be spaced apart relatively greatly as compared, say, to an alternative arrangement in which each of the first and second protrusions 140, 150 is arranged between the other of the first and second protrusions 140, 150 and one of the first and second skins 110, 120. The arrangement of the protrusions 140, 150 in the embodiment better acts to help counter torque loads of the winglet 100 about the connector 230 in use than such an alternative arrangement.

Each of the first and second protrusions 140, 150 may comprise a fusible portion (not shown). That is, a portion of the first and second protrusion 140, 150 may be purposefully configured to fail or break at a predefined stress, for example sheer stress. This may be useful to ensure that if the winglet 100 were to contact an external object with greater than a predetermined force, the winglet 100 detaches from the wing portion 200 before the force is able to damage the wing portion 200.

Figure 3:
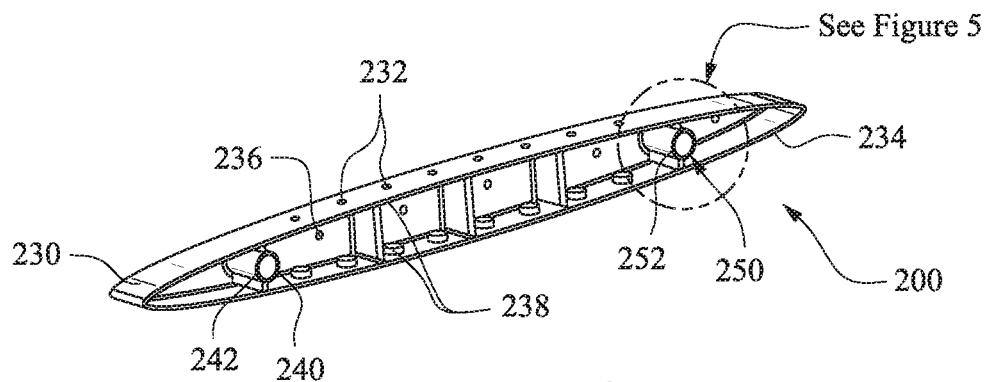
FIG. 3 shows a schematic view of a connector of the wing portion of FIG. 1.
Figure 5:
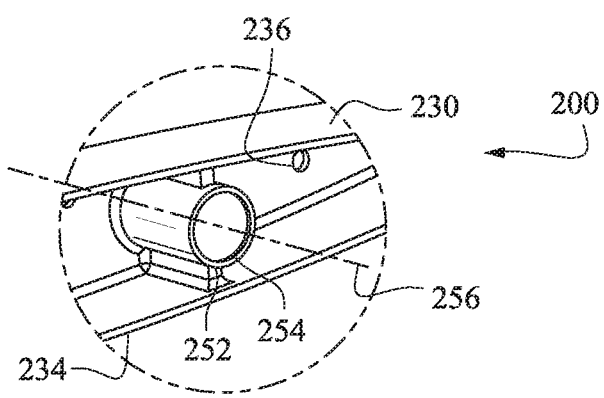
FIG. 5 shows a schematic close-up view of a hole in the wing portion of FIG. 1.

The wing portion 200 of this embodiment will now be described with reference to FIGS. 1, 3 and 5. Broadly speaking, the wing portion 200 has an aerodynamic surface portion 210 and the connector 230 protruding from the aerodynamic surface portion 210. The connector 230 is for locating in the recess 106 of the winglet root 102 of the winglet 100 in use. Moreover, the wing portion 200 comprises the first and second holes 240, 250 for receiving the corresponding first and second protrusions 140, 150 of the winglet 100 in use.

In this embodiment the aerodynamic surface portion 210 is a convex aerodynamic surface portion 210, but in other embodiments the aerodynamic surface portion 210 may be other than convex, such as planar, concave or irregular. In this embodiment the aerodynamic surface portion 210 is a lower skin of the wing portion 200. Although the portion 210 of the aerodynamic surface itself is convex in this embodiment, not all of the rest of the aerodynamic surface need be convex. The aerodynamic surface as a whole could have complex curvature.

The connector 230 of this embodiment takes the form of a bracket with a closed side, an opposite open side, and walls that connect the open and closed sides and define an overall substantially elliptical cross section of the connector 230. A number of braces extend between and connect the walls to help give the connector 230 rigidity. The substantially elliptical cross section of the connector 230 matches that of the bracket 130 of the winglet 100. An edge 234 of the open side may abut the bracket 130 of the winglet 100 when the winglet 100 is attached to the wing portion 200 with the connector 230 located in the recess 106 of the winglet 100. In some embodiments, the edge 234 of the open side of the connector 230 may be resilient or flexible, so as to form a seal for mating with the bracket 130 of the winglet 100 when the winglet 100 is attached to the wing portion 200.

In this embodiment, the connector 230 is affixed to the aerodynamic surface portion 210 by way of a plurality of fasteners (not shown) that extend through apertures 236 in the closed side of the connector 230 and are threadably engaged with the threads of respective barrel nuts or anchor nuts (not shown) that are captive within the wing portion 200. The wing portion 200 may include internal bracing to which the connector 230 is securely attached. However, in other embodiments, the connector 230 may be affixed to the aerodynamic surface portion 210 by some other mechanism, such as non-captive nuts and bolts, an adhesive, may be integral with the aerodynamic surface portion 210, or may be surrounded by the aerodynamic surface portion 210 but not specifically attached to the aerodynamic surface portion 210. The connector 230 need not be detached from the rest of the wing portion 200 in normal use.

The connector 230 of this embodiment comprises, or defines, the first and second holes 240, 250 of the wing portion 200. In particular, in this embodiment two of the braces of the connector 230 have one of the first and second holes 240, 250 formed therein. However, in other embodiments the hole(s) of the wing portion 200 for receiving the protrusion(s) 140, 150 of the winglet 100 in use may be formed by a different component of the wing portion 200, such as the aerodynamic surface portion 210. The first and second holes 240, 250 of the wing portion 200 of this embodiment are spaced apart along a path that extends from a forward portion of the wing portion 200 to an aft portion of the wing portion 200, and are spaced equally to the spacing of the protrusions 140, 150 of the winglet 100.

Each of the holes 240, 250 of the wing portion 200 of this embodiment is a cylindrical hole 240, 250. In other embodiments, the, or each, of the holes 240, 250 may have a different shape. For example, the holes 240, 250 may have a polygonal or elliptical cross sectional shape. However, it is preferred that the cross sectional shapes of the respective holes 240, 250 match the cross sectional shapes of the protrusions that are to be inserted in the holes 240, 250 in use, to help in the transfer of shear loads between the protrusions 140, 150 and the connector 230 in use. The holes 240, 250 of this embodiment are relatively aligned so as to extend along parallel respective axes (see 256 in FIG. 5). These axes are in turn aligned with the direction in which the connector 230 is to be inserted into the recess 106 in use.

In this embodiment, a mouth 242, 252 of each of the first and second holes 240, 250 has a chamfer 254 to aid insertion of the protrusions 140, 150 into the first and second holes 240, 250 in use. However, in other embodiments, the mouths 242, 252 of the holes 240, 250 may have a different shape, such as rounded-edged or square-edged. Moreover, in this embodiment, each hole 240, 250 is tapered from the mouth 242, 252 of the hole 240, 250. That is, a cross-sectional area of the hole 240, 250 perpendicular to the axis 246, 256 of the hole 240, 250 reduces with distance from the mouth 242, 252. This tapering may aid insertion of the protrusions 140, 150 into the first and second corresponding holes 240, 250 in use, and/or may help in the transfer of shear loads between the protrusions 140, 150 and the connector 230 in use.

The connector 230 of this embodiment comprises a plurality of threaded surfaces for mating with respective fasteners 300 for fastening the winglet 100 to the connector 230 when the connector 230 is located in the recess 106 in use. In particular, in this embodiment each of the threaded surfaces is a female screw thread of a barrel nut or anchor nut 238 that is captive within, or affixed relative to, the connector 230 of the wing portion 200. It will be seen in FIG. 3 that in this embodiment the walls of the connector 230 have holes 232 therethrough, and the nuts 238 are located at inner ends of the holes 232.

The holes 232 in the walls are axially aligned with the female screw threads of the respective nuts 238. Moreover, the holes 232 through the walls of the connector 230 are spaced apart along respective substantially straight paths aligned in a direction that extends from the forward portion of the wing portion 200 to the aft portion of the wing portion 200. Furthermore, the holes 232 through the walls of the connector 230 are relatively spaced so as to axially align with the holes 112, 122 through the first and second skins 110, 120 of the winglet 100 when the connector 230 is located in the recess 106. In some embodiments, there may be only a single such hole 232 through one or each of the walls of the connector 230. In some embodiments, there may be no such holes 232 through the walls of the connector 230.

A method of attaching the winglet 100 to the wing portion 200 will now be described with reference to FIGS. 1, 6 and 7.

First, as shown in FIG. 1, the winglet 100 is located relative to the wing portion 200 so that the connector 230 is aligned with the recess 106, and more specifically so that the first and second protrusions 140, 150 of the winglet 100 are axially aligned with the first and second corresponding holes 240, 250 of the wing portion 200.

Figure 6:
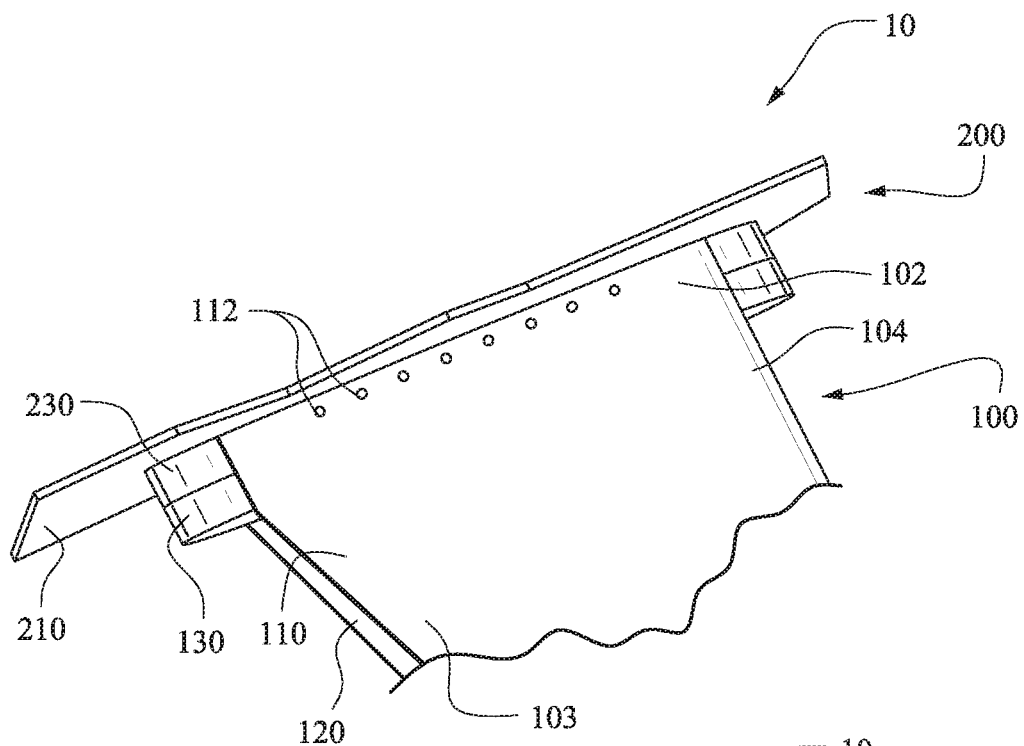
FIG. 6 shows a schematic view of the portion of the winglet of FIG. 1 engaged with the wing portion of FIG. 1.

Then, as shown in FIG. 6, the winglet 100 is offered up to the wing portion 200 until the first and second protrusions 140, 150 of the winglet 100 are located in the first and second corresponding holes 240, 250 of the wing portion 200, the connector 230 is located in the recess 106, and the surface 134 of the bracket 130 abuts the edge 234 of the open side of the connector 230. With the winglet 100 and the wing portion 200 at this position, the holes 112, 122 through the first and second skins 110, 120 of the winglet 100 are axially aligned with the holes 232 through the walls of the connector 230.

Figure 7:
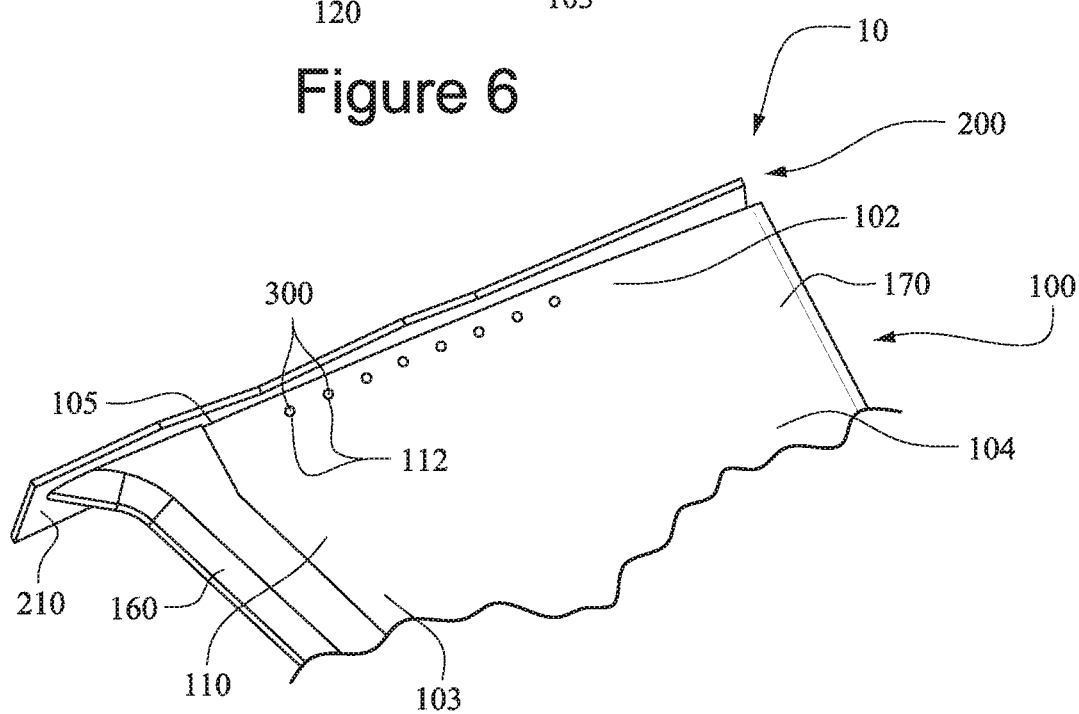
FIG. 7 shows a schematic view of the portion of the winglet of FIG. 1 attached to the wing portion of FIG. 1 and with forward and aft edge panels attached.

Next, as shown in FIG. 7, threaded fasteners 300 are passed through the holes 112, 122 in the first and second skins 110, 120 of the winglet 100, through the holes 232 in the walls of the connector 230, and into the nuts 238 in the connector 230. The threaded fasteners 300 are rotated on such insertion so as to engage with the female threaded surfaces of the nuts 238, which thus axially retain the fasteners 300 and the winglet 100 in position relative to the wing portion 200.

Finally, in this embodiment and as shown in FIG. 7, leading and trailing edge panels 160, 170 are respectively attached to the forward and aft portions 103, 104 of the winglet 100 so as to provide the winglet 100 with aerodynamic forward and aft edges. The forward edge includes a fillet at an end of the edge closest to the wing portion 200. The aft edge is linear or substantially linear. Respective ends of the leading and trailing edge panels 160, 170 closest to the wing portion 200 cooperate with respective edges of the first and second skins 110, 120 closest to the wing portion 200 to form a mouth 105 of the recess 106. When viewed in a direction parallel to a straight line extending from the forward portion 103 to the aft portion 104 of the winglet 100, at least a portion of the mouth 105 of the recess 106 has a concave profile for mating with the convex aerodynamic surface portion 210 of the wing portion 200. Of course, in embodiments in which the aerodynamic surface portion 210 is other than convex, the mouth 105 of the recess 106 may have a correspondingly differently-shaped profile.

Figure 8:
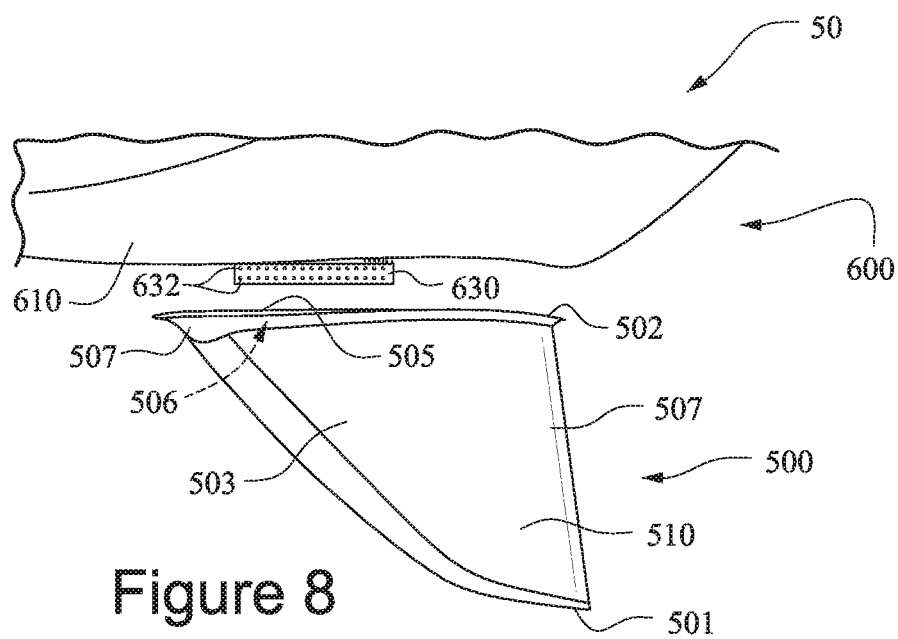
FIG. 8 shows a schematic top view of a winglet and a wing portion according to an embodiment of the invention.
Figure 9:
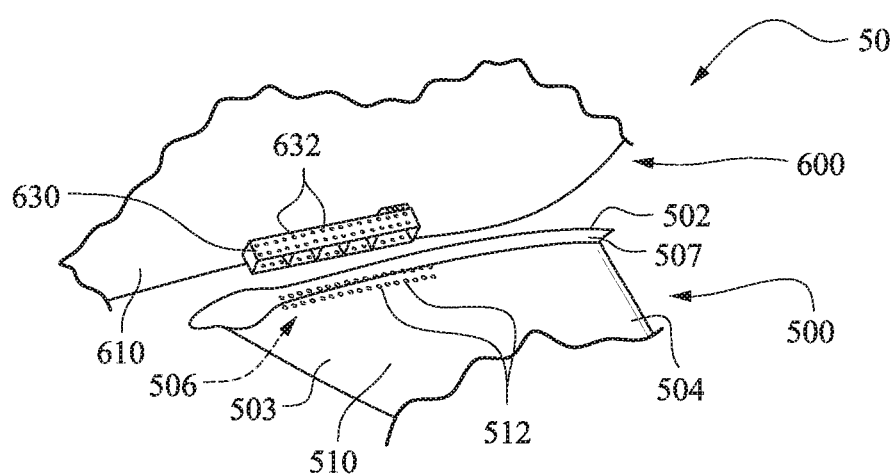
FIG. 9 shows a schematic isometric view of the winglet and the wing portion of FIG. 8.
Figure 10:
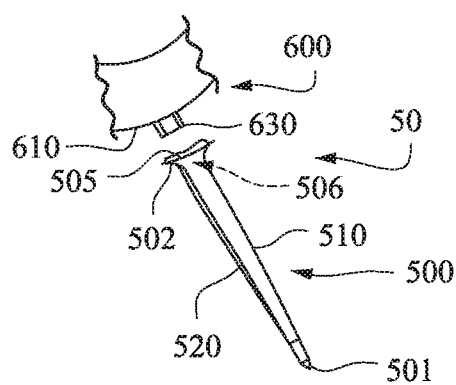
FIG. 10 shows a schematic front view of the winglet and the wing portion of FIG. 8.

Referring to FIGS. 8 to 10, there is shown a schematic view of a winglet 500 according to an embodiment of the invention and a wing portion 600 according to an embodiment of the invention. The winglet 500 is for attachment to the wing portion 600. The wing portion 600 is a wing portion for an aircraft, although the aircraft is not itself shown in full. In this embodiment, as for the embodiment of FIGS. 1 to 7, the wing portion 600 is an upper portion of a wingtip device at an end of a wing distal to the fuselage of the aircraft, and the winglet 500 is a lower portion of the wingtip device. Together the upper portion and the lower portion may form the wingtip device. However, in some embodiments the wing portion 600 may instead be or comprise a lower portion of a wingtip device and the winglet 500 may be an upper portion of the wingtip device for attachment to the wing portion 600.

Broadly speaking the wing portion 600 of this embodiment comprises a convex aerodynamic surface portion 610 and a connector 630 protruding from the convex aerodynamic surface portion 610 for locating in a recess 506 of a winglet root 502 of the winglet 500 in use. On the other hand, the winglet 500 comprises a winglet root 502, a forward portion 503 and an aft portion 504. The winglet root 502 defines the recess 506 for receiving the connector 630 of the wing portion 600 in use. When viewed in a direction parallel to a straight line extending from the forward portion 503 to the aft portion 504 of the winglet 500, a mouth 505 of the recess 506 has a concave profile for mating with the convex aerodynamic surface portion 610 of the wing portion 600. Although the portion 610 of the aerodynamic surface itself is convex in this embodiment, not all of the rest of the aerodynamic surface need be convex. The aerodynamic surface as a whole could have complex curvature.

More specifically, the winglet 500 of this embodiment comprises a winglet tip 501, the winglet root 502 opposite from the winglet tip 501, the forward portion 503 and an aft portion 504. The winglet root 502 is the portion of the winglet 500 that is closest to the wing portion 600 when the winglet 500 is attached to the wing portion 600 in use. Moreover, when the winglet 500 is attached to the wing portion 600, the forward portion 503 of the winglet 500 is closer to the front of the wing portion 600 than is the aft portion 504. In this embodiment, the forward portion 503 defines a forward edge of the winglet 500, which includes a fillet at an end of the forward edge closest to the winglet root 502 and a rounding at an end of the forward edge closest to the winglet tip 501. In this embodiment, the aft portion 504 defines an aft edge of the winglet 500, which is linear or substantially linear.

In this embodiment, the winglet 500 comprises an upper first skin 510 and a lower second skin 520. The winglet 500 may also comprise at least one rib (not shown) and/or at least one spar affixed to, and located between, the first and second skins 510, 520. As discussed above, such rib(s) and/or spar(s) helps to retain the first and second skins 510, 520 relative to each other and to help add rigidity to the winglet 500. The first and second skins 510, 520 may be attached to the rib(s) and/or spar(s) by permanent or semipermanent fastener(s), and should not need disassembly in service. The recess 506 is located between, and at least partially defined by, the combination of the first and second skins 510, 520. More specifically, the first and second skins 510, 520 respectively define upper and lower sides of the recess 506 between the first and second skins 510, 520. In other embodiments, the winglet may be constructed in a different manner. For example, the winglet may not include the separate skins, spar(s) and/or rib(s), but could instead comprise a foam material between the skins 510, 520. The foam material may help to give the winglet rigidity and/or retain the skins 510, 520 relative to each other.

The winglet root 502 of this embodiment comprises a fairing 507 that defines the mouth 505 of the winglet 500. In this embodiment, the fairing 507 is fixed relative to the upper first skin 510 and the lower second skin 520 before the winglet 500 is attached to the wing portion 600. However, in other embodiments, the winglet 500 may be attached to the winglet 500 after attachment of the winglet 500 to the wing portion 600 or during attachment of the winglet 500 to the wing portion 600. In some embodiments, the winglet 500 may have a plurality of fairings 507, and the mouth 505 may be partially or fully defined by one or more of the fairings 507. In some embodiments, the mouth 505 of the recess 506 may be defined by a combination of the fairing(s) 507 and one or more other components of the winglet 500, such as the first and/or second skin 510, 520, such that the fairing(s) 507 define a portion of the mouth 505.

In this embodiments, each of the first and second skins 510, 520 has a plurality of holes 512 extending therethrough. The holes 512 are shown in FIGS. 9 and 12, but omitted from FIGS. 8 and 11. The holes 512 are for receiving respective fasteners for fastening the winglet 500 to the connector 630 of the wing portion 600 when the connector 630 is located in the recess 506, as will be described in more detail below.

In this embodiment, the holes 512 through the first skin 510 are spaced apart along two substantially straight and parallel paths that extend from the forward portion 503 to the aft portion 504. Similarly, in this embodiment, the holes (not shown) through the second skin 520 are spaced apart along substantially straight and parallel paths that extend from the forward portion 503 to the aft portion 504. However, in other embodiments, the holes 512 through the first skin 510 and/or the holes through the second skin 520 may be spaced apart along non-linear paths that extend from the forward portion 503 to the aft portion 504. In some embodiments, there may be only a single such hole 512 through the first skin 510 and/or through the second skin 520. In some embodiments, there may be no such holes 512 through the first skin 510 and/or through the second skin 520.

With continued reference to FIGS. 8 to 10, the connector 630 of this embodiment takes the form of a bracket with a closed side, an opposite open side, and walls that connect the open and closed sides and define an overall substantially rectangular cross section of the connector 630. A number of braces may extend between and connect the walls to help give the connector 630 rigidity. In some embodiments, an edge of the open side of the connector 630 may be resilient or flexible, so as to form a seal for mating with the winglet 500 when the winglet 500 is attached to the wing portion 600. In some such embodiments, the edge of the open side of the connector 630 may be formed from a resilient or flexible material, such as an elastomer.

In this embodiment, the connector 630 is affixed to the aerodynamic surface portion 610 by way of a plurality of fasteners (not shown) that extend through apertures in the closed side of the connector 630 and are threadably engaged with the threads of respective barrel nuts or anchor nuts (not shown) that are captive within the wing portion 600. The wing portion 600 may include internal bracing to which the connector 630 is securely attached. However, in other embodiments, the connector 630 may be affixed to the aerodynamic surface portion 610 by some other mechanism, such as non-captive nuts and bolts, an adhesive, may be integral with the aerodynamic surface portion 610, or may be surrounded by the aerodynamic surface portion 610 but not specifically attached to the aerodynamic surface portion 610. The connector 630 need not be detached from the rest of the wing portion 600 in normal use. In this embodiment the aerodynamic surface portion 610 is a lower skin of the wing portion 600.

The connector 630 of this embodiment comprises a plurality of threaded surfaces for mating with respective fasteners for fastening the winglet 500 to the connector 630 when the connector 630 is located in the recess 506 in use. In particular, in this embodiment each of the threaded surfaces is a female screw thread of a barrel nut or anchor nut that is captive within, or affixed relative to, the connector 630 of the wing portion 600. It will be seen in FIGS. 8 and 9 that in this embodiment the walls of the connector 630 have holes 632 therethrough. The nuts are located at inner ends of these holes 632.

The holes 632 through the walls of the connector 630 are axially aligned with the female screw threads of the respective nuts. Moreover, the holes 632 through the walls of the connector 630 are spaced apart along respective substantially straight paths aligned in a direction that extends from a forward portion of the wing portion 600 to an aft portion of the wing portion 600. Furthermore, the holes 632 through the walls of the connector 630 are relatively spaced so as to axially align with the holes 512 through the first and second skins 510, 520 of the winglet 500 when the connector 630 is located in the recess 506. In some embodiments, there may be only a single such hole 632 through one or each of the walls of the connector 630. In some embodiments, there may be no such holes 632 through the walls of the connector 630.

A method of attaching the winglet 500 to the wing portion 600 will now be described with reference to FIGS. 8 to 13.

First, as shown in FIGS. 8 to 10, the winglet 500 is located relative to the wing portion 600 so that the connector 630 is aligned with the recess 506.

Figure 11:
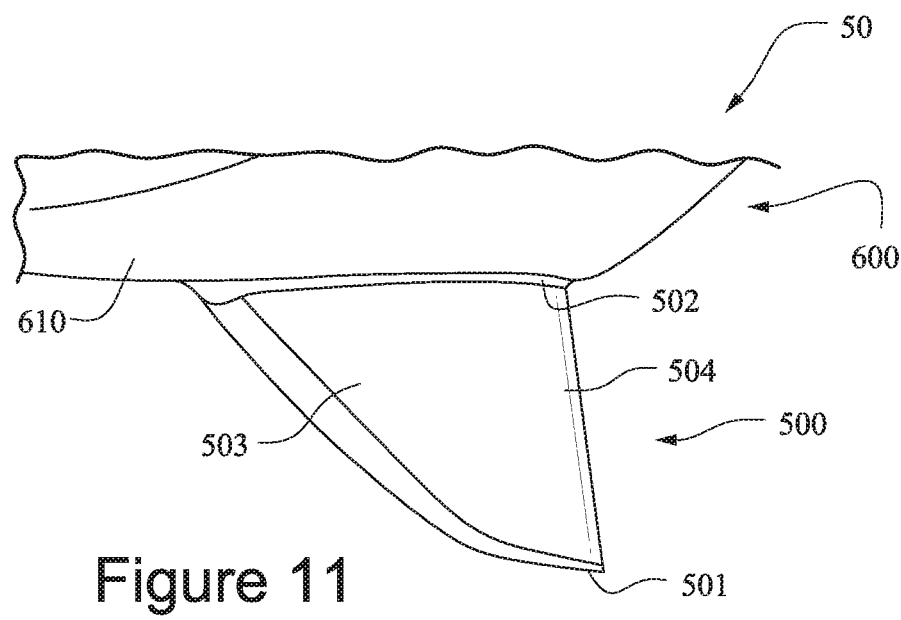
FIG. 11 shows a schematic top view of the winglet of FIG. 8 attached to the wing portion of FIG. 8.
Figure 12:
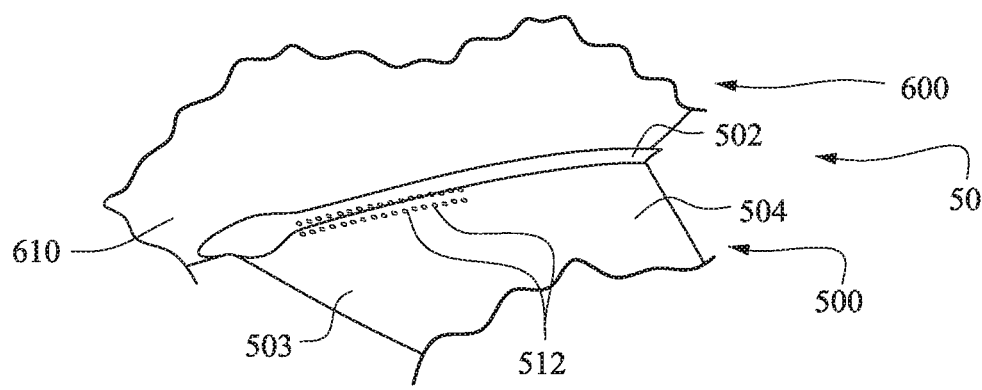
FIG. 12 shows a schematic isometric view of the winglet and the wing portion of FIG. 11.
Figure 13:
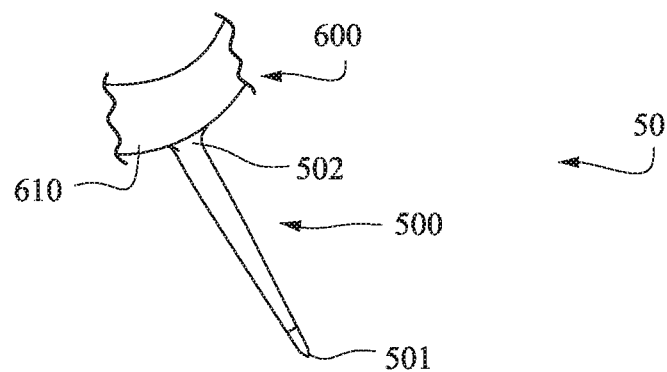
FIG. 13 shows a schematic front view of the winglet and the wing portion of FIG. 11.

Then, as shown in FIGS. 11 to 13, the winglet 500 is offered up to the wing portion 600 until the connector 630 is located in the recess 506, and the concave mouth 505 of the winglet 500 abuts the convex aerodynamic surface portion 610 of the wing portion 600. With the winglet 500 and the wing portion 600 at this position, the holes 512 through the first and second skins 510, 520 of the winglet 500 are axially aligned with the holes 632 through the walls of the connector 630.

Finally, although not expressly shown in the Figures, threaded fasteners are then passed through the holes 512 in the first and second skins 510, 520 of the winglet 500, through the holes 632 in the walls of the connector 630, and into the nuts in the connector 630. The threaded fasteners are rotated on such insertion so as to engage with the female threaded surfaces of the nuts, which thus axially retain the fasteners and the winglet 500 in position relative to the wing portion 600.

Figure 14:
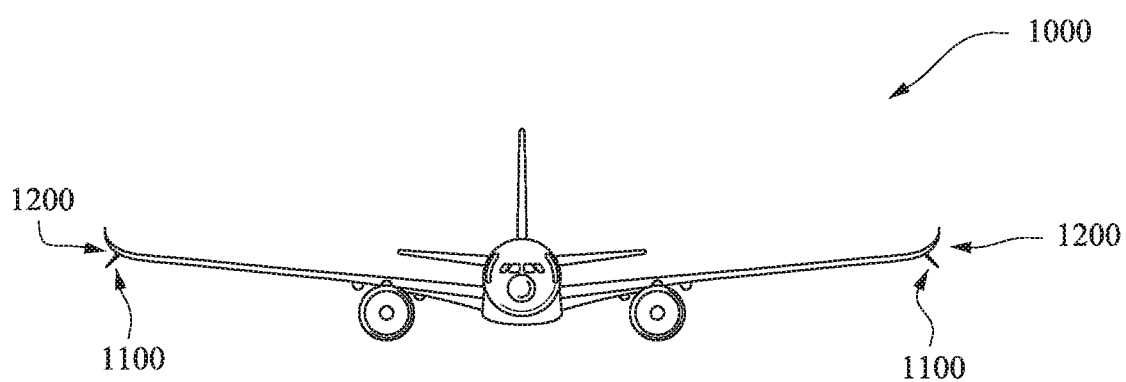
FIG. 14 shows a schematic front view of an aircraft according to an embodiment of the invention.

FIG. 14 shows a schematic front view of an example aircraft 1000 comprising winglets 1100 attached to respective wing portions 1200. Each of the winglets 1100 and wing portions 1200 may be the same as the winglet 100 and wing portion 200, respectively, discussed above with reference to FIGS. 1 to 7. Alternatively, each of the winglets 1100 and wing portions 1200 may be the same as the winglet 500 and wing portion 600, respectively, discussed above with reference to FIGS. 8 to 13.

An advantage of the illustrated embodiments is that no access panel need be provided for opening or removal to enable attachment or detachment of the winglet 100, 500 to or from the wing portion 200, 600. That is, no internal access is required. As compared to known mechanisms for attaching winglets to wing portions, the joints and components of embodiments of the invention are relatively simple, meaning that special tools are not required for their use or operation, and have a reduced part count, which eases logistical concerns.

As will be appreciated from the above description, embodiments of the invention enable surfaces with complex curvature to be joined in a simple manner. Winglets may be rapidly and easily installed, removed and replaced, while still complying with interchangeability requirements. In some embodiments, differently-dimensioned winglets 100, 500 may be attached to the wing portion 200, 600 without amendment to the connector 230, 630 or other parts of the wing portion 200, 600.

Embodiments of the invention that include the one or more protrusions 140, 150 of the winglet 100 for insertion into corresponding holes 240, 250 of the wing portion 200 may offer direct load paths that provide reactions in six degrees of freedom, which in turn enables reduced part size and thus reduced joint weight. Moreover, when the, or each, of the one or more protrusions 140, 150 is fusible, as discussed above in the event of external contact to the winglet 100, the protrusion(s) 140, 150 may shear without damaging the wing portion 200.

The above described examples are to be understood as illustrative examples only. Any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A winglet for attachment to a wing portion of an aircraft, the winglet comprising:
 a winglet root, wherein the winglet root defines a recess configured to receive a connector of the wing portion and the winglet root comprises at least one protrusion for receipt into at least one corresponding hole of the connector of the wing portion, and
 wherein a portion of the winglet root that at least partially defines an upper or a lower side of the recess has at least one hole extending through the portion of the winglet root and configured to receive a fastener that fastens the winglet to the connector when the connector is located in the recess.

2. The winglet according to claim 1, wherein the, or each, protrusion has a root and/or a tip located in the recess.

3. The winglet according to claim 1, wherein the at least one protrusion comprises a plurality of protrusions that extend along parallel respective axes.

4. The winglet according to claim 1, wherein the winglet has a forward portion and an aft portion, wherein the at least one protrusion comprises a first protrusion and a second protrusion, and wherein the first protrusion is closer to the forward portion than to the aft portion and the second protrusion is closer to the aft portion than to the forward portion.

5. The winglet according to claim 1, wherein the winglet has a forward portion and an aft portion, and wherein the at least one hole through the portion of the winglet root comprises a plurality of holes that are spaced apart along a substantially straight path that extends from the forward portion to the aft portion.

6. An aircraft comprising a winglet according to claim 1.

7. A winglet for attachment to a wing portion of an aircraft that has a convex aerodynamic surface, the winglet comprising:
a winglet root,
a forward portion, and
an aft portion,
wherein the winglet root defines a recess configured to receive a connector of the wing portion, and
wherein, when viewed in a direction parallel to a straight line extending from the forward portion to the aft portion, at least a portion of a mouth of the recess has a concave surface configured to abut with the convex aerodynamic surface of the wing portion.

8. The winglet according to claim 7, comprising one or more fairings, wherein the one or more fairings define the mouth or a portion of the mouth.

9. A winglet according to claim 7, wherein, when viewed in the direction parallel to the straight line extending from the forward portion to the aft portion, all of the mouth of the recess has a concave profile for mating with the convex aerodynamic surface of the wing portion.

10. A winglet according to claim 7, wherein a portion of the winglet root that at least partially defines an upper or a lower side of the recess has at least one hole extending through the portion of the winglet root and configured to receive a fastener that fastens the winglet to the connector when the connector is located in the recess.

11. A winglet according to claim 7, wherein the winglet is a lower portion of a wingtip device.

12. A wing portion for an aircraft, the wing portion comprising
an aerodynamic surface, and
a connector protruding from the aerodynamic surface,
wherein the connector is configured to be disposed within a recess of a winglet root of a winglet, and
wherein the wing portion comprises at least one hole configured to receive at least one corresponding protrusion of the winglet, and
the connector comprises the at least one hole.

13. A wing portion according to claim 12, wherein the at least one hole comprises a plurality of holes that extend along parallel respective axes.

14. The wing portion according to claim 12, wherein the at least one hole comprises a plurality of holes that are spaced apart along a path that extends from a forward portion of the wing portion to an aft portion of the wing portion.

15. The wing portion according to claim 12, wherein the connector is affixed to the aerodynamic surface portion.

16. The wing portion according to claim 12, wherein the connector comprises at least one threaded surface configured to mate with a fastener that fastens the winglet to the connector when the connector is located in the recess.

17. A wing portion for an aircraft, the wing portion comprising
a convex aerodynamic surface, and
a connector protruding from the convex aerodynamic surface, wherein the connector is configured to be disposed within a recess of a winglet root of a winglet.

18. The wing portion according to claim 17, wherein the connector is affixed to the aerodynamic surface.

19. The wing portion according to claim 17, wherein the connector comprises at least one threaded surface configured to mate with a fastener that fastens the winglet to the connector when the connector is located in the recess.

* * * * *